United States Patent
Sato et al.

(10) Patent No.: US 9,595,860 B2
(45) Date of Patent: Mar. 14, 2017

(54) FIELD ROTOR OF SUPERCONDUCTING ROTATING MACHINE

(71) Applicant: KAWASAKI JUKOGYO KABUSHIKI KAISHA, Kobe-shi, Hyogo (JP)

(72) Inventors: Yoshichika Sato, Kakogawa (JP); Katsuya Umemoto, Akashi (JP); Takafumi Ito, Kakogawa (JP); Hayato Iwasaki, Kobe (JP); Yousuke Tsumura, Kobe (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 175 days.

(21) Appl. No.: 14/435,770

(22) PCT Filed: Sep. 4, 2013

(86) PCT No.: PCT/JP2013/005222
§ 371 (c)(1),
(2) Date: Apr. 15, 2015

(87) PCT Pub. No.: WO2014/061189
PCT Pub. Date: Apr. 24, 2014

(65) Prior Publication Data
US 2015/0270769 A1   Sep. 24, 2015

(30) Foreign Application Priority Data

Oct. 16, 2012 (JP) ................................. 2012-228945

(51) Int. Cl.
*H02K 9/00*   (2006.01)
*H02K 9/06*   (2006.01)
(Continued)

(52) U.S. Cl.
CPC ............. *H02K 55/04* (2013.01); *H02K 7/003* (2013.01); *H02K 9/005* (2013.01); *H02K 9/20* (2013.01); *Y02E 40/625* (2013.01)

(58) Field of Classification Search
CPC ............. H02K 55/04; H02K 7/00; H02K 9/05
(Continued)

(56) References Cited

U.S. PATENT DOCUMENTS

| 4,155,019 | A  | 5/1979 | Weghaupt |
| 4,811,616 | A  | 3/1989 | Henderson |
| 6,700,274 | B2 | 3/2004 | Gamble et al. |

FOREIGN PATENT DOCUMENTS

| EP | 1 366 559 A1 | 12/2003 |
| EP | 2 479 877 A1 | 7/2012 |

(Continued)

OTHER PUBLICATIONS

May 30, 2016 Extended Search Report issued in European Patent Application No. 13847789.8.
(Continued)

*Primary Examiner* — Jose Gonzalez Quinones
(74) *Attorney, Agent, or Firm* — Oliff PLC (57) ABSTRACT

A field rotor of a superconducting rotating machine including: a rotation shaft; a supply shaft that supplies a refrigerant to the rotation shaft at one end of the rotation shaft; an input/output shaft provided at the other end of the rotation shaft so as to integrally rotate with the rotation shaft; and a superconducting coil held on a circumferential surface of the rotation shaft to be cooled by the refrigerant, wherein the supply shaft and the input/output shaft are fixed to each other so as to rotate integrally with each other, and the rotation shaft and the supply shaft are at least partly brought in contact with each other in order to allow the rotation shaft to be supported by the supply shaft and in order to be
(Continued)

slidably fitted to each other in a circumferential direction of the rotation shaft and in an axial direction of the rotation shaft.

7 Claims, 6 Drawing Sheets

(51) Int. Cl.
  *H02K 55/04* (2006.01)
  *H02K 9/20* (2006.01)
  *H02K 7/00* (2006.01)
(58) Field of Classification Search
  USPC .............. 310/51, 52, 54, 57, 58, 60 A, 61; 335/216; 62/505
  See application file for complete search history.

(56) References Cited

FOREIGN PATENT DOCUMENTS

| | | |
|---|---|---|
| JP | 2004-521592 A | 7/2004 |
| JP | 2004-531187 A | 10/2004 |
| JP | 2008-301665 A | 12/2008 |
| WO | 02/071584 A1 | 9/2002 |

OTHER PUBLICATIONS

Dec. 3, 2013 International Search Report issued in International Application No. PCT/JP2013/005222.

FIELD ROTOR OF SUPERCONDUCTING ROTATING MACHINE

TECHNICAL FIELD

The present invention relates to a field rotor of a superconducting rotating machine.

BACKGROUND ART

PTL1 discloses a rotor of a superconducting electrical rotating machine. In this rotor, torque tubes transmitting rotation torque to the outside are coupled to both sides of a winding mounting shaft in an axial direction. A thermal extension absorbing mechanism for allowing a thermal deformation of the winding mounting shaft is provided to the other end of one of the torque tubes, and this other end is connected to a room-temperature damper shield. The other end of the other torque tube is connected to the other rotation shaft. The inside of the room-temperature damper shield and the torque tube is kept vacuum for heat insulation (paragraph 0004).

PTL 2 discloses a machine including a superconducting winding disposed on a winding support member, and a holding unit holding the winding support member. In this machine, the holding unit that is designed to transmit torque between the winding support member and a rotor shaft part at one side of the rotor and holds the winding support member in a rotor exterior housing is configured as a fixing device at one side for the winding support member at the torque transmission side of the rotor, the holding unit being provided in the rotor exterior housing so as to extend in the axial direction (claim 1).

PTL 3 discloses a machine including a superconducting winding disposed on a winding support member, and a unit for transmitting torque to a shaft part from the winding support member. The machine includes a robust connecting device at a torque-transmission side between the winding support member and a rotor shaft part, the connecting device including a hollow cylindrical connecting element that transmits torque and that is made of plastic reinforced with fiber materials; and a unit for holding the winding support member in the rotor exterior housing. The connecting device is formed integrally by end parts in axial direction and a center part located between them, wherein the end parts have a corrugated shape seen in a circumferential direction, while the center part is not corrugated. The connecting element is connected on the end parts to flange-like end pieces, which are made of metals, in such a manner that they are engaged with one another with frictional coupling. The end parts completely project, and the center part projects in only one region, to groove-like recesses in the respective flange-like end pieces. At least one side wall of each recess has a corrugated shape matched to the corrugated shape of the respective end parts, and the corrugated shape of each end part abuts at least partially the corrugated shape of the side wall of the corresponding recess. Parts of the connecting element which are arranged in the recesses are fixed by means of at least partial filling of the remaining areas of the recesses. The flange-like end pieces are connected in a frictional coupling manner to an associated part of the winding support member and/or to a side part, which is connected to the rotor shaft part, of the rotor exterior housing (claim 1). In addition, the connecting device is desirably configured to allow axial compensation for expansion resulting from shrinkage of cooled-down rotor parts (paragraph 0022).

PTL4 discloses a torque transmission mechanism in a superconducting rotating machine. In the torque transmission mechanism, a torque tube holding a superconducting winding is fixed to an endplate in a cantilevered fashion (FIGS. 6 and 7 of U.S. Pat. No. 6,700,274).

CITATION LIST

Patent Literature

PTL 1: Japanese Unexamined Patent Application Publication No. 2008-301665
PTL 2: Japanese Unexamined Patent Application Publication No. 2004-531187
PTL 3: Japanese Unexamined Patent Application Publication No. 2004-521592
PTL 4: Specification of U.S. Pat. No. 6,700,274

SUMMARY OF INVENTION

Technical Problem

The present invention aims to provide a structure of a field rotor of a superconducting rotating machine, the structure more easily satisfying both a demand to ensure a function of efficiently cooling a superconducting coil and a demand to ensure a mechanical strength for transmitting torque between the superconducting coil and an input/output shaft, than the background art.

Solution to Problem

A field rotor of a superconducting rotating machine according to one aspect of the present invention includes: a rotation shaft; a supply shaft that supplies a refrigerant to the rotation shaft at one end of the rotation shaft; an input/output shaft provided at the other end of the rotation shaft so as to integrally rotate with the rotation shaft; and a superconducting coil held on a circumferential surface of the rotation shaft to be cooled by the refrigerant, wherein the supply shaft and the input/output shaft are fixed to each other so as to rotate integrally with each other, and the rotation shaft and the supply shaft are at least partly brought in contact with each other in order to allow the rotation shaft to be supported by the supply shaft and in order to be slidably fitted to each other in a circumferential direction of the rotation shaft and in an axial direction of the rotation shaft.

Advantageous Effects of Invention

The field rotor of a superconducting rotating machine according to the present invention brings an effect of providing a structure that more easily satisfies both a demand to ensure a function of efficiently cooling a superconducting coil and a demand to ensure a mechanical strength for transmitting torque between the superconducting coil and an input/output shaft, than the background art.

DESCRIPTION OF EMBODIMENTS

Hereinafter, the embodiments of the present invention will be described with reference to the drawings. In the description below, a "central axis", a "circumferential surface", a "circumferential direction", and a "diameter direction" respectively indicate a central axis (central axis parallel to a direction in which a rotation axis extends), a circumferential surface, a circumferential direction, and a diameter direction of a rotation axis, unless otherwise specified. For the sake of convenience of description, the direction of the central axis is defined as a front-back direction, the side to which power is inputted/outputted is defined as a front side, and the side to which electric power or refrigerant is inputted/outputted is defined as a back side.

(First Embodiment)

A field rotor of a superconducting rotating machine according to a first aspect of a first embodiment includes: a rotation shaft; a supply shaft that supplies a refrigerant to the rotation shaft at one end of the rotation shaft; an input/output shaft provided at the other end of the rotation shaft so as to integrally rotate with the rotation shaft; and a superconducting coil held on a circumferential surface of the rotation shaft to be cooled by the refrigerant, wherein the supply shaft and the input/output shaft are fixed to each other so as to rotate integrally with each other, and the supply shaft and the rotation shaft are at least partly brought in contact with each other in order to allow the rotation shaft to be supported by the supply shaft and in order to be slidably fitted to each other in a circumferential direction of the rotation shaft and in an axial direction of the rotation shaft.

The configuration described above can more easily satisfy all of three demands than a background art, the three demands including a demand to ensure a function of efficiently cooling a superconducting coil, a demand to ensure a mechanical strength for transmitting torque between the superconducting coil and the input/output shaft, and a demand to absorb a thermal contraction of the rotor caused by cooling of the superconducting coil.

A field rotor of a superconducting rotating machine according to a second aspect of the first embodiment is the field rotor of a superconducting rotating machine according to the first aspect of the first embodiment, wherein the supply shaft and the rotation shaft are disposed such that one of them having relatively a large thermal contraction amount in a diameter direction upon a change from a room-temperature state to a cool-temperature state is located at the outer circumference of the other one having relatively a small thermal contraction amount.

With this configuration, one of the supply shaft and the rotation shaft with relatively a large thermal contraction amount is contracted toward an axis, thereby tightening the other one with a small thermal contraction amount from the outer circumference. With this configuration, the supply shaft and the rotation shaft mutually exert a correction action, whereby an alignment function can effectively and autonomously be attained.

A field rotor of a superconducting rotating machine according to a third aspect of the first embodiment is the field rotor of a superconducting rotating machine according to the second aspect of the first embodiment, wherein the thermal contraction amount of the rotation shaft is relatively larger than the thermal contraction amount of the supply shaft.

With this configuration, the rotation shaft has lower temperature in the cool-temperature state, whereby the thermal contraction amount of the rotation shaft is easy to be increased more than the thermal contraction amount of the supply shaft. Therefore, the autonomous alignment function can more easily and more effectively be attained.

A field rotor of a superconducting rotating machine according to a fourth aspect of the first embodiment is the field rotor of a superconducting rotating machine according to the third aspect of the first embodiment, wherein the supply shaft and the rotation shaft are formed such that a clearance is formed between a vertically lower end of the supply shaft and a vertically lower end of the rotation shaft at a room-temperature state, and a clearance is not formed between the vertically lower end of the supply shaft and the vertically lower end of the rotation shaft at a cool-temperature state.

With this configuration, the rotation shaft sufficiently tightens the supply shaft at the cool-temperature state, whereby the autonomous alignment function can more effectively be attained.

A field rotor of a superconducting rotating machine according to a fifth aspect of the first embodiment is the field rotor of a superconducting rotating machine according to any one of the first to fourth aspects of the first embodiment, wherein the portion of the rotation shaft, which portion is fitted to the supply shaft, is hollow.

With this configuration, a heat transfer area from the supply shaft to the rotation shaft is decreased, whereby the superconducting coil can more efficiently be cooled.

A field rotor of a superconducting rotating machine according to a sixth aspect of the first embodiment is the field rotor of a superconducting rotating machine according to any one of the first to fifth aspects of the first embodiment, wherein the portion of the rotation shaft, which portion holds the superconducting coil, is hollow.

With this configuration, a heat transfer area and a heat capacity of the rotation shaft are decreased, whereby the superconducting coil can more efficiently be cooled. Also with this configuration, the weight of the rotation shaft is decreased, whereby the alignment function can more surely be attained.

A field rotor of a superconducting rotating machine according to a seventh aspect of the first embodiment is the field rotor of a superconducting rotating machine according to any one of the first to sixth aspects of the first embodiment, wherein a hollow torque tube having a relatively small thickness in a diameter direction is formed between the rotation shaft and the input/output shaft.

This configuration decreases a heat transfer area from the supply shaft to the rotation shaft, and provides excellent heat insulating property, whereby the superconducting coil can more efficiently be cooled.

The examples below describe that voltage and current are supposed to be continuously supplied to a superconducting coil from the outside of the superconducting coil. However, the embodiment may employ a configuration in which voltage and current are not continuously supplied from the outside of the superconducting coil, and a field winding is used in a so-called permanent current mode.

A field rotor according to the present embodiment operates as stored in a stator armature not illustrated. Since a known structure can be used for the stator armature, its description will be omitted.

First Example

Figure 1:
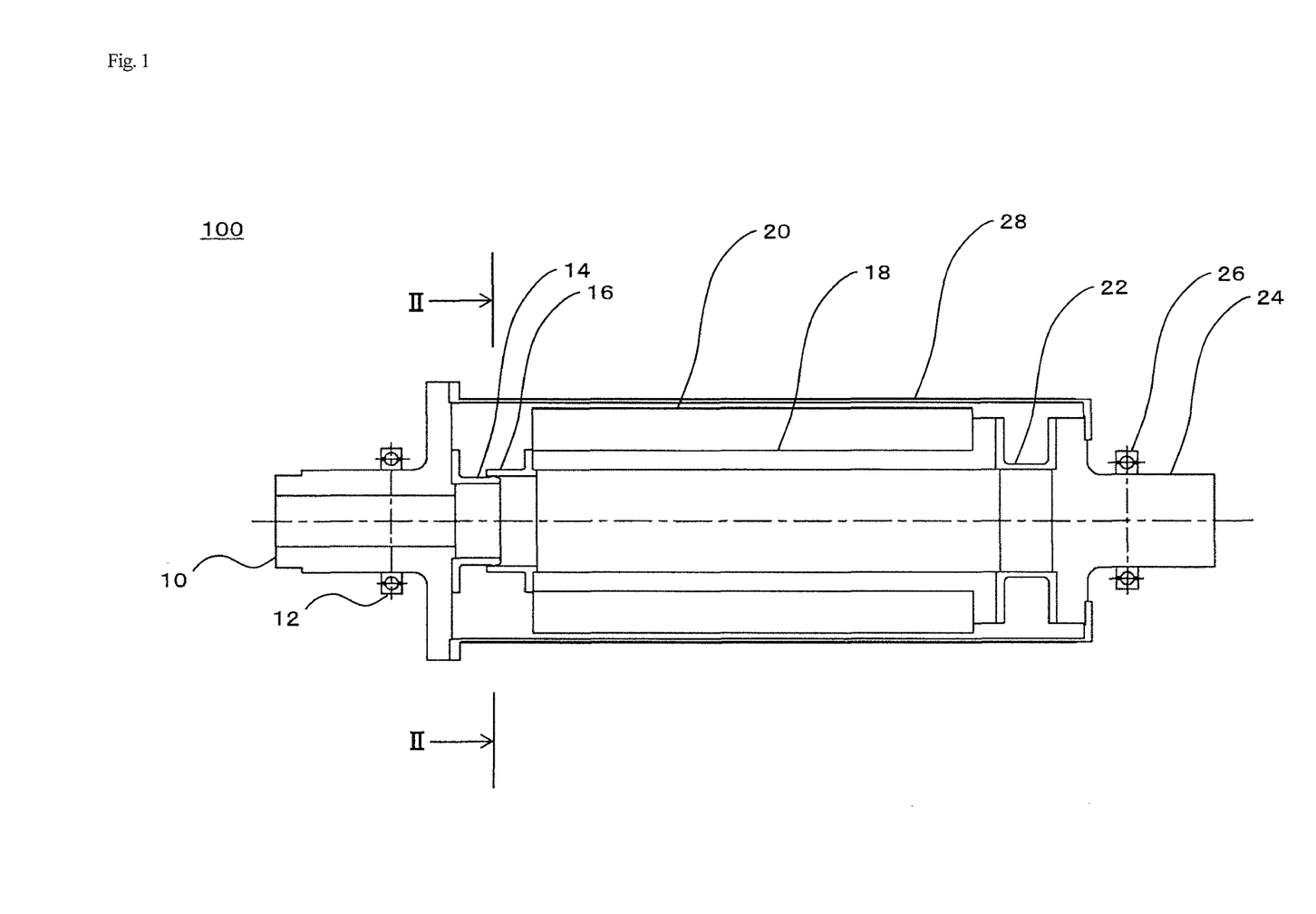
FIG. 1 is a sectional view showing one example of a schematic configuration of a field rotor of a superconducting rotating machine taken along a vertical cutting plane passing through a central axis, according to a first example of a first embodiment.

FIG. 1 is a sectional view showing one example of a schematic configuration of a field rotor of a superconducting rotating machine taken along a vertical cutting plane passing through a central axis, according to a first example of the first embodiment.

A field rotor 100 of a superconducting rotating machine includes a rotation shaft 18, a supply shaft 10, an input/output shaft 24, and a superconducting coil 20.

In the case where the field rotor 100 has electromagnetically an air-cored structure, for example, the rotation shaft 18 is made of a nonmagnetic material such as an austenite stainless steel or a composite material such as GFRP or CFRP. Alternatively, in the case where the field rotor 100 has electromagnetically an iron core structure, for example, the rotation shaft 18 is made of a magnetic material such as martensite stainless, ferrite stainless, or iron alloy.

The supply shaft 10 supplies a refrigerant to the rotation shaft 18 or the superconducting coil 20 at one end (left end in FIG. 1) of the rotation shaft 18. A type of a refrigerant is not particularly limited. For example, liquid nitrogen, liquid helium, or low-temperature helium gas can be used for the refrigerant. The refrigerant is supplied to the rotation shaft 18 from the supply shaft 10 through a refrigerant channel (not illustrated). In the configuration shown in FIG. 1, the supply shaft 10 and the rotation shaft 18 both have a cylindrical space extending along the central axis, and the refrigerant channel is formed in the space, for example. In the example shown in FIG. 1, the supply shaft 10 is supported to be rotatable by a bearing 12. The supply shaft 10 can be made of a stainless steel, for example. The supply shaft 10 is not necessarily hollow. So long as a channel for supplying a refrigerant to the supply shaft 10 is provided, the similar function can be attained.

The input/output shaft 24 is provided at the other end (right end in FIG. 1) of the rotation shaft 18 so as to integrally rotate with the rotation shaft 18. When the superconducting rotating machine is an electric motor, the input/output shaft 24 is a shaft serving as an output shaft, and when the superconducting rotating machine is a power generator, the input/output shaft 24 is a shaft serving as an input shaft.

Specifically, the input/output shaft 24 and the rotation shaft 18 may be continuous with each other and be formed integral with each other, for example. Alternatively, the input/output shaft 24 and the rotation shaft 18 may be separately formed, and they may be fixed to each other with a fixing member such as a bolt, for example. In the example shown in FIG. 1, the input/output shaft 24 is supported to be rotatable by a bearing 26. In the example shown in FIG. 1, a hollow torque tube 22 with relatively a small thickness in a diameter direction is formed between the rotation shaft 18 and the input/output shaft 24. The input/output shaft 24 can be made of a stainless steel, a nickel base alloy, or a titanium alloy, for example.

The supply shaft 10 and the input/output shaft 24 are fixed to each other so as to integrally rotate. Specifically, in the example shown in FIG. 1, the supply shaft 10 and the input/output shaft 24 are fixed to each other via a room-temperature damper 28. The supply shaft 10 and the room-temperature damper 28 may be fixed to each other with a fixing member such as a bolt, for example. The room-temperature damper 28 and the input/output shaft 24 may be fixed to each other with a fixing member such as a bolt, for example. The supply shaft 10 and the input/output shaft 24 are not necessarily formed as separate members.

The room-temperature damper 28 is made of clad steels formed by bonding austenite stainless steel and copper, for example. The room-temperature damper 28 is connected to the supply shaft 10 and the input/output shaft 24 in an airtight manner. The inside of the room-temperature damper 28 is in vacuum (very low pressure state) during an operation of the superconducting rotating machine in order to cool the superconducting coil 20.

The superconducting coil 20 is held on the circumferential surface of the rotating shaft 18, and cooled by the refrigerant. The superconducting coil 20 is made of bismuth superconducting wire materials or yttrium superconducting wire materials, for example. The superconducting coil 20 is cooled to around 30 K by the refrigerant flowing through the refrigerant channel during the operation of the superconducting rotating machine, thereby being brought into a superconducting state, for example.

The supply shaft 10 and the rotation shaft 18 are at least partly in contact with each other, whereby the rotation shaft 18 is supported by the supply shaft 10, and they are fitted to each other so as to be slidable in the circumferential direction of the rotation shaft 18 and the axial direction of the rotation shaft 18. The specific form of the slidable portion in the present example will be described below.

In the example shown in FIG. 1, a supply-shaft-side slide portion 14 is fixed to the supply shaft 10, and a rotation-shaft-side slide portion 16 is fixed to the rotation shaft 18. The supply-shaft-side slide portion 14 and the supply shaft 10 may be made of the same material, or may be made of different materials. The rotation-shaft-side slide portion 16 and the rotation shaft 18 may be made of the same material, or may be made of different materials. The supply-shaft-side slide portion 14 and the supply shaft 10 may be integrally and continuously formed with the same material. The rotation-shaft-side slide portion 16 and the rotation shaft 18 may be integrally and continuously formed with the same material. The supply-shaft-side slide portion 14 and the rotation-shaft-side slide portion 16 both have a solid columnar or cylindrical shape extending generally parallel to the central axis. The shaft at the outer circumference out of the supply-shaft-side slide portion 14 and the rotation-shaft-side slide portion 16 has to be cylindrical, but the shaft at the inner circumference can be a solid columnar or cylindrical.

A fitting clearance between the supply-shaft-side slide portion 14 and the rotation-shaft-side slide portion 16 at a room temperature-state can be selected from a loose fit, a transition fit, and a tight fit according to the difference in a thermal contraction amount between the supply-shaft-side slide portion 14 and the rotation-shaft-side slide portion 16 in order to appropriately keep: 1) assembling property at a room-temperature state; 2) sliding performance for absorbing the difference in the thermal contraction amount in the long axis direction during the cooling process from the room-temperature state to the cool-temperature state; and 3) tightening force and stress state for an alignment function at a cool-temperature state. Notably, the fitting clearance is a difference between a diameter of a shaft and a diameter of a hole into which the shaft is inserted. The loose fit, the transition fit, and the tight fit are based on JIS B 0401 or ISO 286. For example, the loose fit is a fitting in which a clearance is always formed. The tight fit is a fitting in which an interference is always formed. The transition fit is a fitting in which either one of a clearance and an interference is formed depending on actual dimensions of a hole and a shaft.

The cool-temperature state can be a temperature state in which the superconducting coil is cooled to be in a superconducting state (the same shall apply hereafter). Specifically, the cool-temperature state can be a state in which the superconducting coil is cooled to around 30 K, for example. The room-temperature state can be a temperature state before the superconducting coil is cooled to be in the cool-temperature state (the same shall apply hereafter). Specifically, the room temperature can be an ambient temperature.

When the supply-shaft-side slide portion 14 and the rotation-shaft-side slide portion 16 are made of the same material, for example, it is desirably configured such that the rotation-shaft-side slide portion 16 at the cool-temperature side encloses the supply-shaft-side slide portion 14 in order to attain the autonomous alignment effect at the cool-temperature state as in the example in FIG. 1. In this case, the thermal contraction amount in the diameter direction of the rotation-shaft-side slide portion 16 located at the low temperature side is larger than the thermal contraction amount in the diameter direction of the supply-shaft-side slide portion 14, so that the rotation-shaft-side slide portion 16 acts in the direction of tightening the supply-shaft-side slide portion 14 at the cool-temperature state. The thermal contraction amount can be a difference between a length at the room-temperature state and a length at the cool-temperature state. In such an example, the fitting between the supply-shaft-side slide portion 14 and the rotation-shaft-side slide portion 16 is desirably a loose fit at the room-temperature state. Specifically, H6/h6 or H8/f6 can be employed for a fitting tolerance, for example. It is to be noted that H6 and H8 indicate a hole tolerance in JIS B 0401, while h6 and f6 indicate an axis tolerance, and a clearance can be formed in a fitting portion based on these tolerances.

In the case where the thermal contraction amount of the rotation-shaft-side slide portion 16 at the low temperature side is smaller than the thermal contraction amount of the supply-shaft-side slide portion 14 even in the example in FIG. 1, the fitting is loosed during the cooling process. In such a case, it is preferable to take a countermeasure for compensating the alignment function, such as to increase a thickness of a plate at the supply-shaft-side slide portion 14 or the rotation-shaft-side slide portion 16 in order to increase rigidity, or to employ a tight fit at the room-temperature state in order to compensate the looseness in the fitting caused by cooling. However, the case in which the thickness of the plate is not increased is more advantageous for the cooling, and the case in which the tight fit is not employed can more satisfactorily keep the assembling property and sliding performance. In the case where the tight fit cannot be employed due to the restriction of the strength of the material for the supply-shaft-side slide portion 14 or the rotation-shaft-side slide portion 16, a transition fit is desired. In such a case, since the alignment function depends on the rigidity of the supply-shaft-side slide portion 14 and the rotation-shaft-side slide portion 16, the rigidity has to be sufficiently increased. However, it is preferable to focus on attaining both the rigidity and the cooling performance.

Figure 2A:
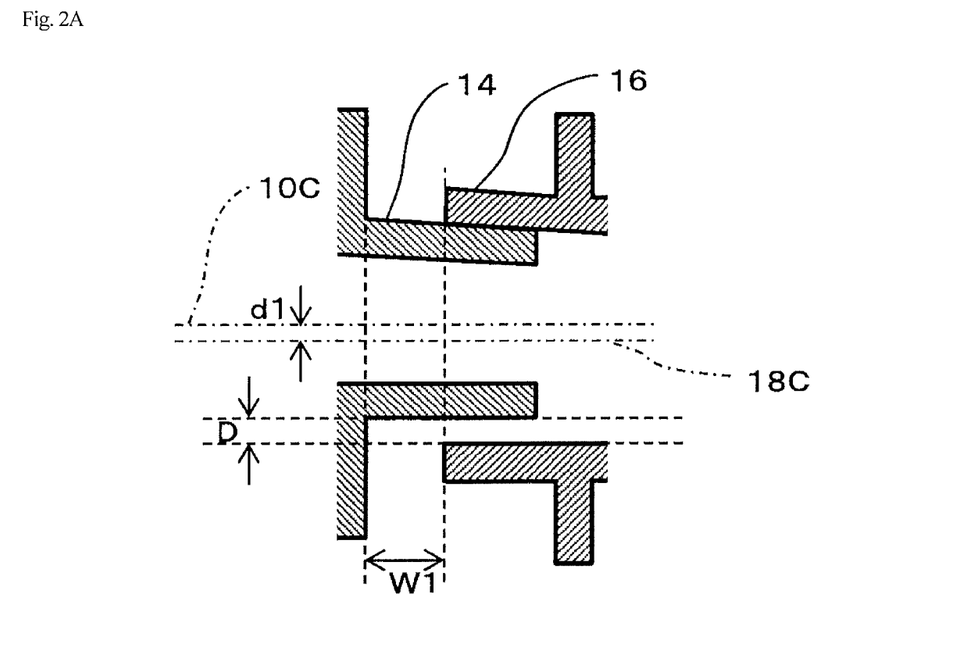
FIG. 2A is a schematic sectional view showing one example of a schematic configuration of a slidable portion at the side close to a supply shaft in the field rotor of the superconducting rotating machine at a room-temperature state according to the first example of the first embodiment, the slidable portion being shown as taken along a vertical cutting plane passing through a central axis.
Figure 2B:
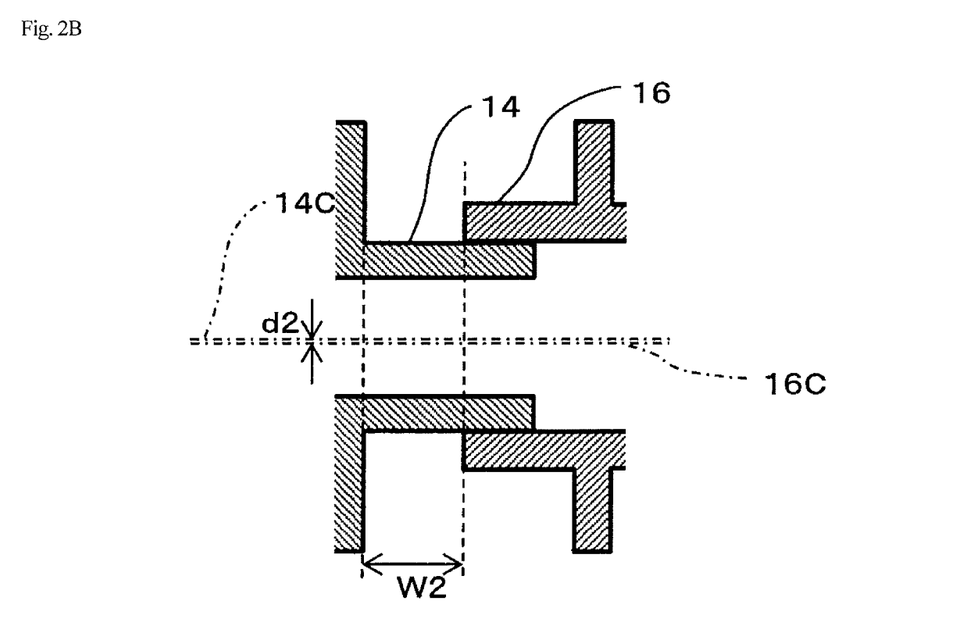
FIG. 2B is a schematic sectional view showing one example of a schematic configuration of the slidable portion at the side close to the supply shaft in the field rotor of the superconducting rotating machine at a cool-temperature state according to the first example of the first embodiment, the slidable portion being shown as taken along a vertical cutting plane passing through the central axis.

FIG. 2A is a schematic sectional view showing one example of a schematic configuration of a slidable portion at the side close to the supply shaft in the field rotor of the superconducting rotating machine at a room-temperature state according to the first example of the first embodiment, the slidable portion being shown as taken along a vertical cutting plane passing through the central axis. FIG. 2B is a schematic sectional view showing one example of a schematic configuration of the slidable portion at the side close to the supply shaft in the field rotor of the superconducting rotating machine at a cool-temperature state according to the first example of the first embodiment, the slidable portion being shown as taken along a vertical cutting plane passing through the central axis. Notably, a ratio is exaggeratedly illustrated in FIGS. 2A and 2B for the description.

The present example is configured such that the supply shaft 10 is inserted into the rotation shaft 18. More specifically described, the present example is configured such that the supply-shaft-side slide portion 14 of the supply shaft 10 is inserted into the rotation-shaft-side slide portion 16 of the rotation shaft 18. The rotation-shaft-side slide portion 16 is placed on the supply-shaft-side slide portion 14 at the connection portion between the supply shaft 10 and the rotation shaft 18. In the room-temperature state, the supply-shaft-side slide portion 14 and the rotation-shaft-side slide portion 16 are deformed from a cylinder with an exact circle due to the own weight of the rotation shaft 18. Therefore, a clearance D larger than the fitting clearance calculated from the sizes of the supply-shaft-side slide portion 14 and the rotation shaft 18 before the deformation is formed between the vertically lower end of the rotation shaft 18 and the vertically lower end of the supply shaft 10, i.e., between the vertically lower end of the supply-shaft-side slide portion 14 and the vertically lower end of the rotation-shaft-side slide portion 16. The clearance D can specifically be about 0.1 mm, for example.

The rotation shaft 18 is cooled by the supply of the refrigerant, so that the temperature of the rotation shaft 18 becomes lower than the temperature of the supply shaft 10. Accordingly, in the case where the rotation-shaft-side slide portion 16 and the supply-shaft-side slide portion 14 are made of the same material, the thermal contraction amount in the diameter direction of the rotation-shaft-side slide portion 16 becomes larger than the thermal contraction amount in the diameter direction of the supply-shaft-side slide portion 14 at the cool-temperature state. As a result, the rotation-shaft-side slide portion 16 acts to tighten the supply-shaft-side slide portion 14, and the supply shaft and the rotation shaft mutually exert a correction action, whereby the alignment function can effectively and autonomously be attained. The following reasons are considered as a principle of the effective action of the alignment mechanism.

1) For example, when own thermal contraction or uniform tightening force is additionally applied to a cylinder of which exact circle has been deformed due to an application of local external force to an outer circumferential surface, and hence, uniform internal force for holding a shape of the exact circle is applied to a wall of the cylinder, a contribution rate of the local external force exerted to a whole deformation is consequently reduced, whereby the shape of the cylinder becomes close to an exact circle. Accordingly, an autonomous alignment function is exerted.

2) For example, when the fitting portions of the rotation-shaft-side slide portion 16 and the supply-shaft-side slide portion 14 are in contact with each other on the entire circumference as shown in FIG. 2B, bending rigidity for a cross-section taken along a cutting plane perpendicular to a central axis of the cylinder becomes larger than the structure in which only the vertically upper sides are in contact with each other as shown in FIG. 2A, because they support each other. Accordingly, support rigidity of the rotation-shaft-side slide portion 16 and the supply-shaft-side slide portion 14 to the rotating member 18 is increased, which enhances the alignment function.

Specifically, a deviation d2 between an axis 10C of the supply shaft 10 and an axis 18C of the rotation shaft 18 at the cool-temperature state is smaller than a deviation d1 at the room-temperature state (d1>d2), for example. Therefore, the alignment function is autonomously attained due to the contraction upon the cooling. It is to be noted that the axis 10C of the supply shaft 10 means a central axis of the supply shaft 10 and an axis parallel to the central axis of the rotation shaft 18, while the axis 18C of the rotation shaft 18 means a central axis of the rotation shaft 18 (the same shall apply hereafter). Notably, the cool-temperature state can be a temperature state after the superconducting coil is cooled to be in the superconducting state during the operation of the superconducting rotating machine (the same shall apply hereafter). Specifically, the cool-temperature state can be a state in which the superconducting coil is cooled to around 30 K (about −243 degrees Celsius), for example.

When the rotation shaft 18 is cooled, the supply-shaft-side slide portion 14, the rotation shaft 18, and the torque tube 22 are thermally contracted also in the axial direction. However, since the room-temperature damper 28 is hardly changed, a gap W2 between the supply shaft 10 and the rotation shaft 18 in the axial direction (distance between a base part of the supply-shaft-side slide portion 14 and an end of the rotation-shaft-side slide portion 16 in FIG. 2) at the cool-temperature state becomes larger than a gap W1 at the room-temperature state (W1<W2). Accordingly, the length of the supply-shaft-side slide portion 14 is preferably longer than the gap W2.

In the present example, a clearance is not formed between the vertically lower end of the rotation shaft 18 and the vertically lower end of the supply shaft 10, i.e., between the vertically lower end of the supply-shaft-side slide portion 14 and the vertically lower end of the rotation-shaft-side slide portion 16, at the cool-temperature state. In other words, the rotation shaft 18 and the supply shaft 10 are in contact with each other on the entire circumference at the cool-temperature state. Specifically, the supply-shaft-side slide portion 14 and the rotation-shaft-side slide portion 16 are in contact with each other on the entire circumference at the cool-temperature state. With this configuration, the supply-shaft-side slide portion 14 is efficiently tightened by the rotation-shaft-side slide portion 16 at the cool-temperature state, whereby the alignment function can more effectively be attained.

Notably, a clearance may be formed between the vertically lower end of the rotation shaft 18 and the vertically lower end of the supply shaft 10, i.e., between the vertically lower end of the supply-shaft-side slide portion 14 and the vertically lower end of the rotation-shaft-side slide portion 16. Even in this case, the alignment function can be attained, since the supply-shaft-side slide portion 14 is tightened by the rotation-shaft-side slide portion 16.

Figure 3A:
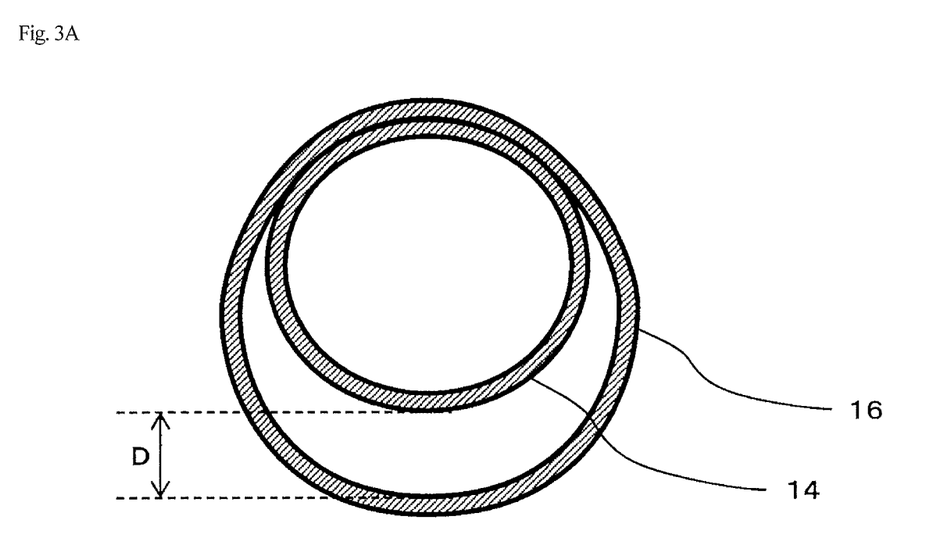
FIG. 3A is a schematic sectional view showing one example of a schematic configuration of the slidable portion at the side close to the supply shaft in the field rotor of the superconducting rotating machine at a room-temperature state according to the first example of the first embodiment, the slidable portion being shown as taken along a surface perpendicular to the central axis.
Figure 3B:
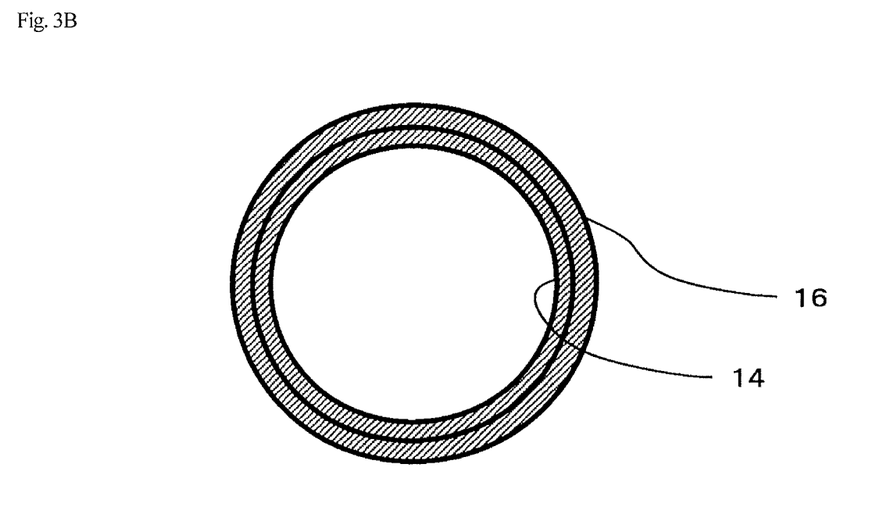
FIG. 3B is a schematic sectional view showing one example of a schematic configuration of the slidable portion at the side close to the supply shaft in the field rotor of the superconducting rotating machine at a cool-temperature state according to the first example of the first embodiment, the slidable portion being shown as taken along a surface perpendicular to the central axis.

FIG. 3A is a schematic sectional view showing one example of a schematic configuration of the slidable portion at the side close to the supply shaft in the field rotor of the superconducting rotating machine at a room-temperature state according to the first example of the first embodiment, the slidable portion being shown as taken along a cutting plane perpendicular to the central axis. FIG. 3B is a schematic sectional view showing one example of a schematic configuration of the slidable portion at the side close to the supply shaft in the field rotor of the superconducting rotating machine at a cool-temperature state according to the first example of the first embodiment, the slidable portion being shown as taken along a cutting plane perpendicular to the central axis. Notably, a ratio is exaggeratedly illustrated in FIGS. 3A and 3B for the description.

As shown in FIG. 3A, the supply-shaft-side slide portion 14 has an elliptic shape whose upper side in section in the vertical direction is deformed due to the rotation-shaft-side slide portion 16 placed thereon. On the other hand, the rotation-shaft-side slide portion 16 has a vertically extending sectional shape due to its own weight, since its upper end is supported by the supply-shaft-side slide portion 14. More specifically, the upper part of the rotation-shaft-side slide portion 16 is deformed along the shape of the deformed upper part of the supply-shaft-side slide portion 14. However, the upper part has larger own weight to be supported than the lower part, thereby being strongly pulled and stretched. Consequently, the rotation-shaft-side slide portion 16 has an egg-shaped cross-section as a whole. A clearance D is formed between the vertically lower end of the supply-shaft-side slide portion 14 and the vertically lower end of the rotation-shaft-side slide portion 16 at the room-temperature state.

As shown in FIG. 3B, the rotation-shaft-side slide portion 16 is thermally contracted more greatly than the supply-shaft-side slide portion 14 at the cool-temperature state, so that its shape becomes closer to an exact circle than at the room-temperature state. The supply-shaft-side slide portion 14 is thermally contacted by the cooling, and tightened by the rotation-shaft-side slide portion 16 from the circumference. Therefore, the deformation or distortion is corrected, whereby the shape of the supply-shaft-side slide portion 14 becomes closer to an exact circle than at the room-temperature state.

In the present example, a clearance is not formed between the vertically lower end of the supply shaft 10 and the vertically lower end of the rotation shaft 18, i.e., between the vertically lower end of the supply-shaft-side slide portion 14 and the vertically lower end of the rotation-shaft-side slide portion 16, at the cool-temperature state. In other words, the supply-shaft-side slide portion 14 and the rotation-shaft-side slide portion 16 are in contact with each other on the entire circumference at the cool-temperature state. With this configuration, the supply-shaft-side slide portion 14 is efficiently tightened by the rotation-shaft-side slide portion 16 at the cool-temperature state, whereby the alignment function can more effectively be attained.

As described above, the supply-shaft-side slide portion 14 and the rotation-shaft-side slide portion 16 are not fixed by a fixing member or the like, but the supply-shaft-side slide portion 14 is only inserted into the rotation-shaft-side slide portion 16. With this configuration, the supply-shaft-side slide portion 14 and the rotation-shaft-side slide portion 16 can mutually slide in the circumferential direction of the rotation shaft 18, and can also mutually slide in the axial direction of the rotation shaft 18. So long as sliding possibility in the circumferential direction and in the axial direction is ensured, the supply-shaft-side slide portion 14 and the rotation-shaft-side slide portion 16 may be integrally and continuously formed at a portion other than the sliding surface with any fastening member.

Since the connection portion can slide in the circumferential direction, strong stress is not generated on the connection portion between the supply shaft 10 and the rotation shaft 18, even if rotation force (torque) is applied to the rotation shaft 18 by the superconducting coil 20, for example. In other words, since the connection portion can slide in the circumferential direction, a distortion between the supply shaft 10 and the rotation shaft 18 in the rotating direction can be absorbed by the sliding motion in the circumferential direction.

Since the connection portion can slide in the axial direction, stress caused by a suppression of the thermal contraction in the axial direction is not generated at the connection portion between the rotation shaft 18 and the supply shaft 10, even if the rotation shaft 18 is contracted by the cooling. In other words, since the connection portion can slide in the axial direction, a displacement between the supply shaft 10 and the rotation shaft 18 in the axial direction can be absorbed by the sliding motion in the axial direction.

From the above, the connection portion between the supply shaft 10 and the rotation shaft 18 does not necessarily have high strength, resulting in that a heat transfer area of the connection portion between the supply shaft 10 and the rotation shaft 18, i.e., a heat transfer area of the torque tube 22, can easily be reduced. Alternatively, a material having less strength than a metal material but having excellent heat insulating property, e.g., a composite material such as GFRP or CFRP, can easily be applied to the supply-shaft-side slide portion 14 and the rotation-shaft-side slide portion 16. The configuration described above is easy to implement a demand to ensure a function of efficiently cooling a superconducting coil without deteriorating a torque transmission function or an alignment function.

On the other hand, since the input/output shaft 24 is provided to integrally rotate with the rotation shaft 18, torque can be transmitted between both the superconducting coil 20 and the rotation shaft 18 and the input/output shaft 24. Since the thermal contraction in the axial direction is absorbed by the sliding motion of the supply-shaft-side slide portion 14 and the rotation-shaft-side slide portion 16, the connection portion between the rotation shaft 18 and the input/output shaft 24 can form a structure specific to the alignment function and the torque transmission function. Thus, it becomes easy to sufficiently ensure a strength at the connection portion between the rotation shaft 18 and the input/output shaft 24, whereby a demand to ensure a mechanical strength for a torque transmission between the superconducting coil and the input/output shaft is easy to be implemented.

In addition, since the supply shaft 10 and the input/output shaft 24 are fixed to each other such that they integrally rotate, the supply shaft 10 can substantially rotate integrally with the rotation shaft 18, even if torque is not transmitted via the supply-shaft-side slide portion 14 and the rotation-shaft-side slide portion 16 from the rotation shaft 18.

Specifically, the field rotor of the superconducting rotating machine according to the present example can be configured such that one end of the rotation shaft has a function of only alignment and absorption of thermal contraction without having an input/output function of torque, while the other end of the rotation shaft effectively has a function of only alignment and input/output of torque.

For example, the hollow torque tube 22 with relatively a small thickness in a diameter direction is easy to be formed between the rotation shaft and the input/output shaft. This configuration decreases a heat transfer area from the output shaft to the rotation shaft, and provides excellent heat insulating property, whereby the superconducting coil can more efficiently be cooled.

In addition, a load to the torque tube 22 holding the weight of the rotation shaft 18 at the side opposite to the slide portion can further be lowered due to the above autonomous alignment function by the supply-shaft-side slide portion 14 and the rotation-shaft-side slide portion 16, whereby the heat transfer area of the torque tube 20 can more easily be reduced.

Consequently, the configuration described above can more easily satisfy both a demand to ensure a function of efficiently cooling the superconducting coil and a demand to ensure a mechanical strength for transmitting torque between the superconducting coil and the input/output shaft, than the background art.

Second Example

Figure 4:
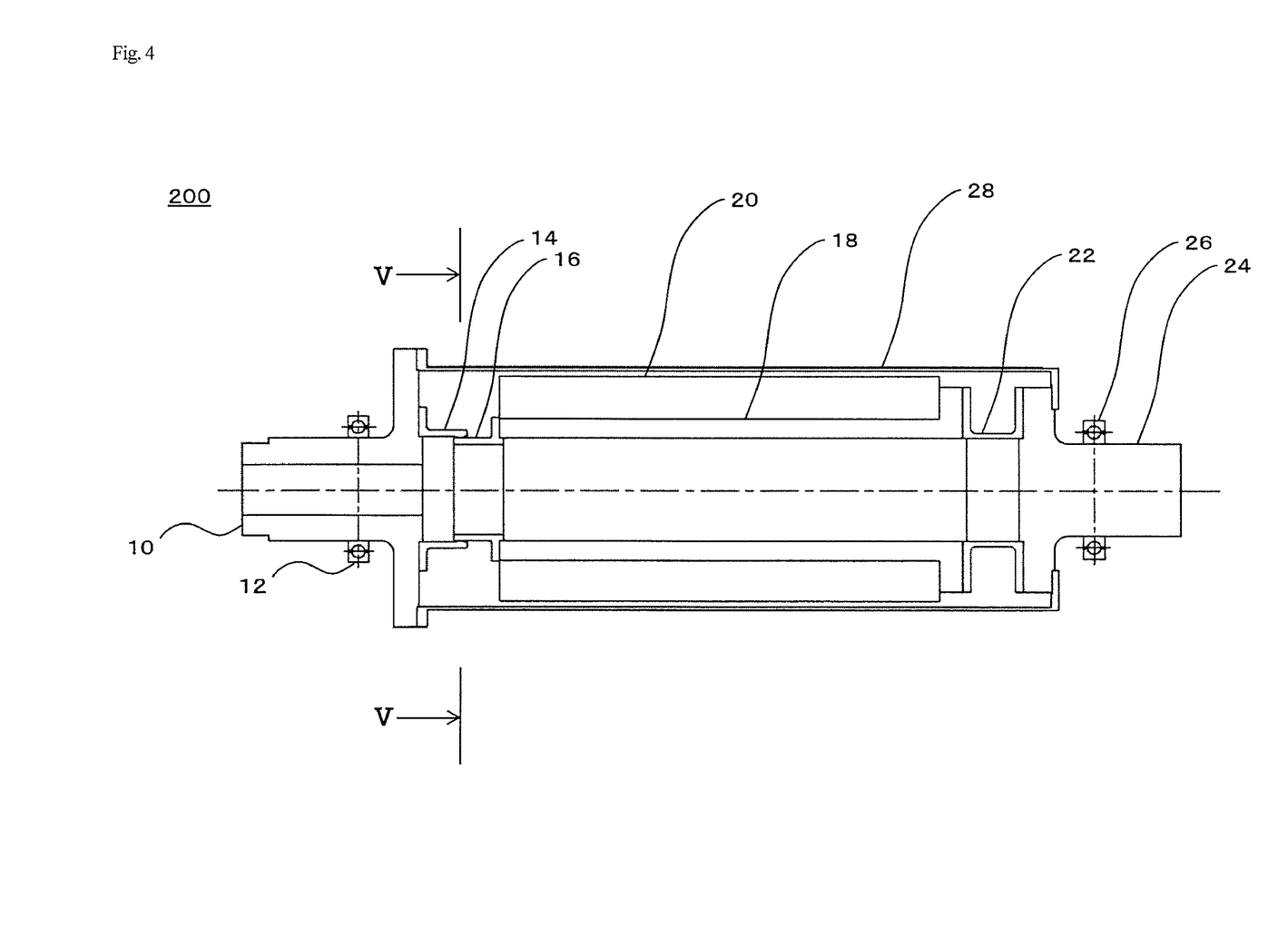
FIG. 4 is a sectional view showing one example of a schematic configuration of a field rotor of a superconducting rotating machine taken along a vertical cutting plane passing through a central axis, according to a second example of the first embodiment.

FIG. 4 is a sectional view showing one example of a schematic configuration of a field rotor of a superconducting rotating machine taken along a vertical cutting plane passing through a central axis, according to a second example of the first embodiment.

A field rotor 200 of the superconducting rotating machine according to the present example can be configured similarly to the field rotor 100 in the superconducting rotating machine according to the first example, except for the structures of the supply-shaft-side slide portion 14 and the rotation-shaft-side slide portion 16. Therefore, same reference numerals and names are given to the same components in FIGS. 4 and 1, and the detailed description will be omitted.

In the example shown in FIG. 4, the supply-shaft-side slide portion 14 is fixed to the supply shaft 10, and the rotation-shaft-side slide portion 16 is fixed to the rotation shaft 18. The supply-shaft-side slide portion 14 and the supply shaft 10 may be integrally formed. The rotation-shaft-side slide portion 16 and the rotation shaft 18 may be integrally formed. The supply-shaft-side slide portion 14 and the rotation-shaft-side slide portion 16 both have a solid columnar or cylindrical shape extending generally parallel to the central axis. The shaft at the outer circumference out of the supply-shaft-side slide portion 14 and the rotation-shaft-side slide portion 16 has to be cylindrical, but the shaft at the inner circumference can be a solid columnar or cylindrical.

The supply-shaft-side slide portion 14 and the rotation-shaft-side slide portion 16 both have a cylindrical shape extending generally parallel to the central axis. An inner diameter of the supply-shaft-side slide portion 14 is larger than an outer diameter of the rotation-shaft-side slide portion 16 at the room-temperature state. Therefore, the rotation-shaft-side slide portion 16 can be inserted into the supply-shaft-side slide portion 14 with a clearance between the rotation-shaft-side slide portion 16 and the supply-shaft-side slide portion 14 at the room-temperature state.

The fitting clearance between the supply-shaft-side slide portion 14 and the rotation-shaft-side slide portion 16 can be the same as the first example, except that the dimensional relation is inverted. Accordingly, the detailed description will be omitted.

Figure 5A:
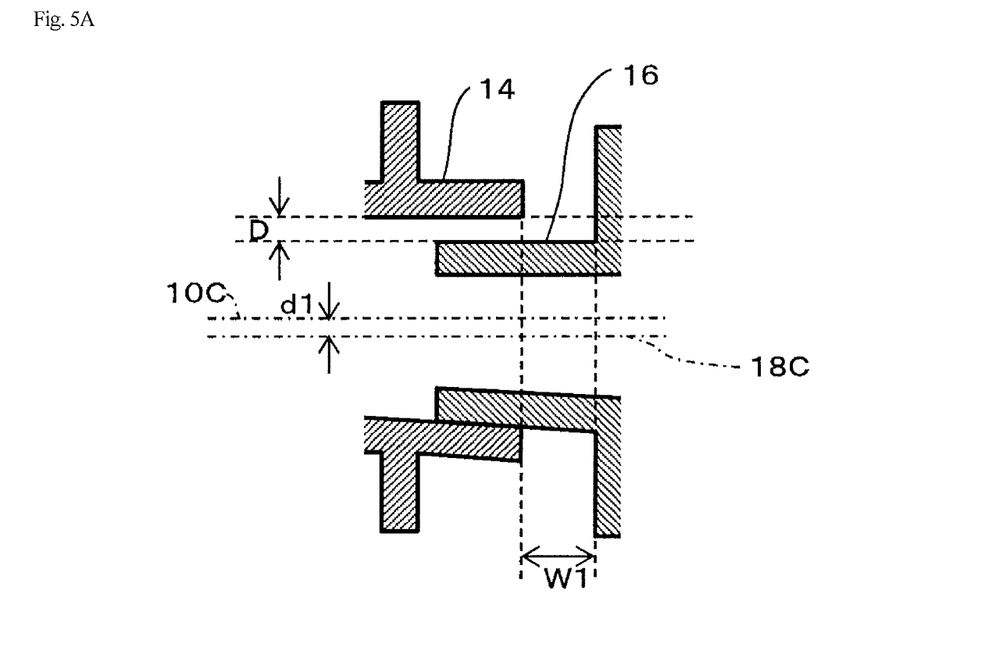
FIG. 5A is a schematic sectional view showing one example of a schematic configuration of a slidable portion at the side close to a supply shaft in the field rotor of the superconducting rotating machine at a room-temperature state according to the second example of the first embodiment, the slidable portion being shown as taken along a vertical cutting plane passing through the central axis.
Figure 5B:
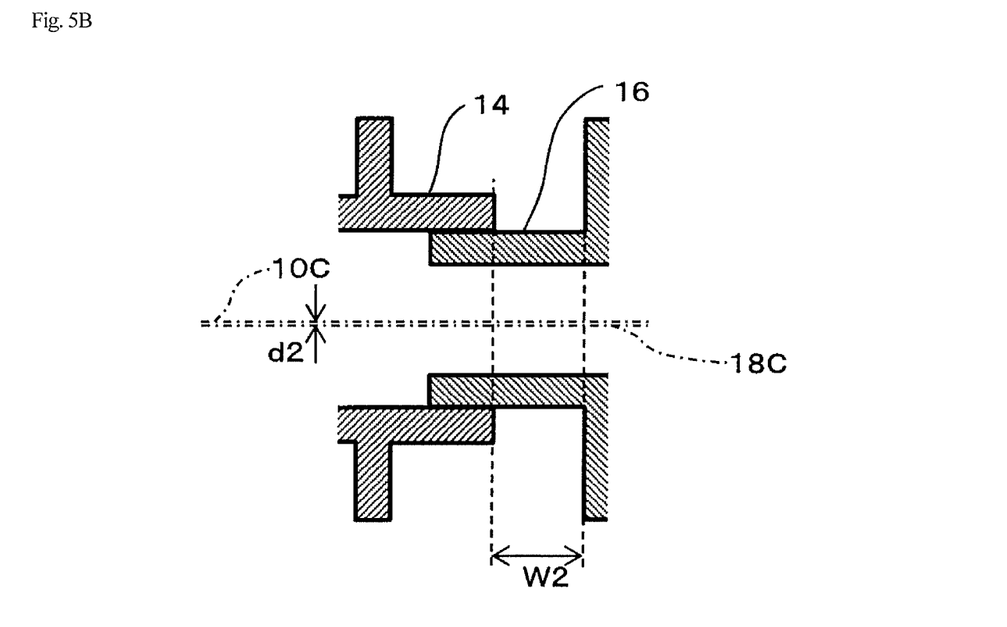
FIG. 5B is a schematic sectional view showing one example of a schematic configuration of the slidable portion at the side close to the supply shaft in the field rotor of the superconducting rotating machine at a cool-temperature state according to the second example of the first embodiment, the slidable portion being shown as taken along a vertical cutting plane passing through the central axis.

FIG. 5A is a schematic sectional view showing one example of a schematic configuration of a slidable portion at the side close to the supply shaft in the field rotor of the superconducting rotating machine at a room-temperature state according to the second example of the first embodiment, the slidable portion being shown as taken along a vertical cutting plane passing through the central axis. FIG. 5B is a schematic sectional view showing one example of a schematic configuration of the slidable portion at the side close to the supply shaft in the field rotor of the superconducting rotating machine at a cool-temperature state according to the second example of the first embodiment, the slidable portion being shown as taken along a vertical cutting plane passing through the central axis. Notably, a ratio is exaggeratedly illustrated in FIGS. 5A and 5B for the description.

The present example is configured such that the rotation shaft 18 is inserted into the supply shaft 10. More specifically, the present example is configured such that the rotation-shaft-side slide portion 16 of the rotation shaft 18 is inserted into the supply-shaft-side slide portion 14 of the supply shaft 10. The rotation-shaft-side slide portion 16 is placed on the supply-shaft-side slide portion 14 at the connection portion between the supply shaft 10 and the rotation shaft 18. In the room-temperature state, the supply-shaft-side slide portion 14 and the rotation-shaft-side slide portion 16 are deformed from a cylinder with an exact circle due to the own weight of the rotation shaft 18. Therefore, a clearance D larger than the fitting clearance calculated from the sizes of the supply-shaft-side slide portion 14 and the rotation shaft 18 before the deformation is formed between the vertically upper end of the rotation shaft 18 and the vertically upper end of the supply shaft 10, i.e., between the vertically upper end of the supply-shaft-side slide portion 14 and the vertically upper end of the rotation-shaft-side slide portion 16. The clearance D can specifically be about 0.1 mm, for example.

The rotation shaft 18 is cooled by the supply of the refrigerant, so that the temperature of the rotation shaft 18 becomes lower than the temperature of the supply shaft 10. On the other hand, the supply shaft 10 is also cooled, since heat is absorbed to the rotation shaft 18. In the case where the supply shaft 10 is made of a material having larger coefficient of linear thermal expansion than that of a material of the rotation shaft 18, for example, the thermal contraction amount in the diameter direction of the supply shaft 10 becomes larger than the thermal contraction amount in the diameter direction of the rotation shaft 18 at the cool-temperature state. Examples of the combination of such materials include a combination of a stainless steel as the material of the supply shaft 10 and an Invar alloy as the material of the rotation shaft 18. With this configuration, a deviation d2 between an axis 10C of the supply shaft 10 and an axis 18C of the rotation shaft 18 at the cool-temperature state is smaller than a deviation d1 at the room-temperature state (d1>d2). As a result, the supply-shaft-side slide portion 14 acts to tighten the rotation-shaft-side slide portion 16, and the supply shaft and the rotation shaft mutually exert a correction action, whereby the alignment function can effectively and autonomously be attained. The principle in which the alignment mechanism is effectively exerted is as stated in the first example. Therefore, the description will be omitted.

When the rotation shaft 18 is cooled, the supply-shaft-side slide portion 14, the rotation shaft 18, and the torque tube 22 are thermally contracted also in the axial direction. However, since the room-temperature damper 28 is hardly changed, a gap W2 between the supply shaft 10 and the rotation shaft 18 in the axial direction (distance between an end of the supply-shaft-side slide portion 14 and a base part of the rotation-shaft-side slide portion 16 in FIG. 5) at the cool-temperature state becomes larger than a gap W1 at the room-temperature state (W1<W2). Accordingly, the length of the rotation-shaft-side slide portion 16 is preferably longer than the gap W2.

In the present example, a clearance is not formed between the vertically upper end of the rotation shaft 18 and the vertically upper end of the supply shaft 10, i.e., between the vertically upper end of the supply-shaft-side slide portion 14 and the vertically upper end of the rotation-shaft-side slide portion 16, at the cool-temperature state. In other words, the rotation shaft 18 and the supply shaft 10 are in contact with each other on the entire circumference at the cool-temperature state. Specifically, the supply-shaft-side slide portion 14 and the rotation-shaft-side slide portion 16 are in contact with each other on the entire circumference at the cool-temperature state. With this configuration, the rotation-shaft-side slide portion 16 is efficiently tightened by the supply-shaft-side slide portion 14 at the cool-temperature state, whereby the alignment function can more effectively be attained.

Figure 6A:
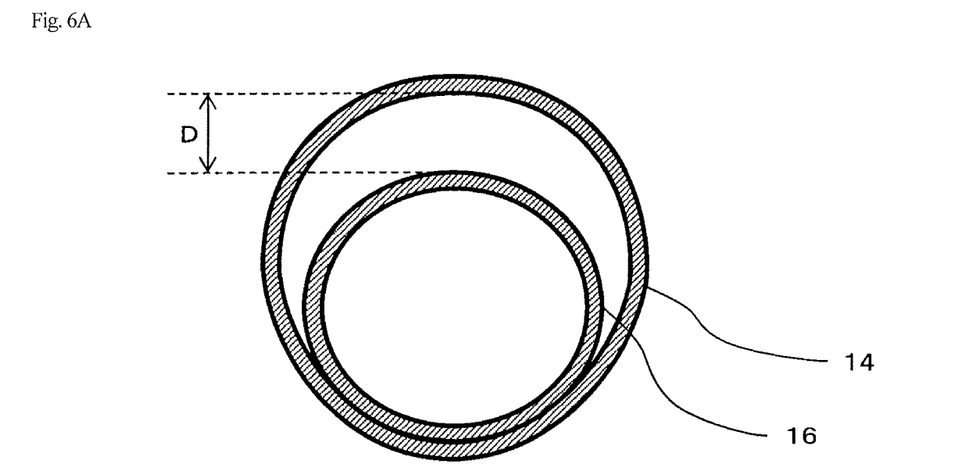
FIG. 6A is a schematic sectional view showing one example of a schematic configuration of the slidable portion at the side close to the supply shaft in the field rotor of the superconducting rotating machine at a room-temperature state according to the second example of the first embodiment, the slidable portion being shown as taken along a surface perpendicular to the central axis.
Figure 6B:
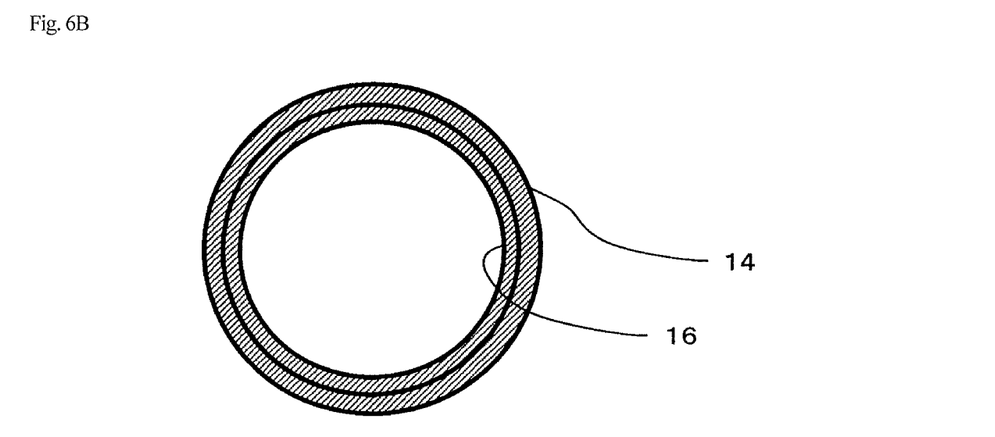
FIG. 6B is a schematic sectional view showing one example of a schematic configuration of the slidable portion at the side close to the supply shaft in the field rotor of the superconducting rotating machine at a cool-temperature state according to the second example of the first embodiment, the slidable portion being shown as taken along a surface perpendicular to the central axis.

FIG. 6A is a schematic sectional view showing one example of a schematic configuration of the slidable portion at the side close to the supply shaft in the field rotor of the superconducting rotating machine at a room-temperature state according to the second example of the first embodiment, the slidable portion being shown as taken along a cutting plane perpendicular to the central axis. FIG. 6B is a schematic sectional view showing one example of a schematic configuration of the slidable portion at the side close to the supply shaft in the field rotor of the superconducting rotating machine at a cool-temperature state according to the second example of the first embodiment, the slidable portion being shown as taken along a cutting plane perpendicular to the central axis. Notably, a ratio is exaggeratedly illustrated in FIGS. 6A and 6B for the description.

As shown in FIG. 6A, the supply-shaft-side slide portion 14 has a sectional shape extending in the vertical direction at the room-temperature state due to own weight and the rotation-shaft-side slide portion 16 placed on the lower end. More specifically, the lower part of the supply-shaft-side slide portion 14 is deformed along the shape of the deformed lower part of the rotation-shaft-side slide portion 16, and the upper part has larger own weight to be supported than the lower part, thereby being strongly pulled and stretched. Consequently, the supply-shaft-side slide portion 14 has an egg-shaped cross-section as a whole. On the other hand, the rotation-shaft-side slide portion 16 has an elliptic shape whose lower side in section in the vertical direction is deformed due to own weight, because it is placed on the supply-shaft-side slide portion 14. A clearance D is formed between the vertically upper end of the supply-shaft-side slide portion 14 and the vertically upper end of the rotation-shaft-side slide portion 16 at the room-temperature state.

As shown in FIG. 6B, the supply-shaft-side slide portion 14 is thermally contracted more greatly than the rotation-shaft-side slide portion 16 at the cool-temperature state, so that its shape becomes closer to an exact circle than at the room-temperature state. The rotation-shaft-side slide portion 16 is thermally contacted by the cooling, and tightened by the supply-shaft-side slide portion 14 from the circumference. Therefore, the deformation or distortion is corrected, whereby the shape of the rotation-shaft-side slide portion 16 becomes closer to an exact circle than at the room-temperature state.

In the present example, a clearance is not formed between the vertically upper end of the supply shaft 10 and the vertically upper end of the rotation shaft 18, i.e., between the vertically upper end of the supply-shaft-side slide portion 14 and the vertically upper end of the rotation-shaft-side slide portion 16, at the cool-temperature state. In other words, the supply-shaft-side slide portion 14 and the rotation-shaft-side slide portion 16 are in contact with each other on the entire circumference at the cool-temperature state. With this configuration, the rotation-shaft-side slide portion 16 is efficiently tightened by the supply-shaft-side slide portion 14 at the cool-temperature state, whereby the alignment function can more effectively be attained.

A clearance may be formed between the vertically upper end of the rotation shaft 10 and the vertically upper end of the supply shaft 18, i.e., between the vertically upper end of the supply-shaft-side slide portion 14 and the vertically upper end of the rotation-shaft-side slide portion 16, at the cool-temperature state. Even in this case, the alignment function can be attained, since the rotation-shaft-side slide portion 16 is tightened by the supply-shaft-side slide portion 14.

As described above, the supply-shaft-side slide portion 14 and the rotation-shaft-side slide portion 16 are not fixed by a fixing member or the like, but the rotation-shaft-side slide portion 16 is only inserted into the supply-shaft-side slide portion 14. With this configuration, the supply-shaft-side slide portion 14 and the rotation-shaft-side slide portion 16 can mutually slide in the circumferential direction of the rotation shaft 18, and can also mutually slide in the axial direction of the rotation shaft 18. So long as sliding possibility in the circumferential direction and in the axial direction is ensured, the supply-shaft-side slide portion 14 and the rotation-shaft-side slide portion 16 may be integrally and continuously formed at a portion other than the sliding surface with any fastening member.

The similar effect to the first example can be obtained even by the present example. Specifically, the field rotor of the superconducting rotating machine according to the present example can be configured such that one end of the rotation shaft has a function of only alignment and absorption of thermal contraction without having an input/output function of torque, while an input/output function of torque can be concentrated on the other end of the rotation shaft. Consequently, the configuration described above can more easily satisfy both a demand to ensure a function of efficiently cooling the superconducting coil and a demand to ensure a mechanical strength for transmitting torque between the superconducting coil and the input/output shaft, than the background art.

The modifications similar to the first example, such as the formation of the torque tube, are possible also in the second example.

From the foregoing description, many modifications and other embodiments of the present invention are obvious to those in the art. Accordingly, the foregoing description should be construed as only exemplification, and has been given to those in the art for the purpose of providing best aspects to carry out the present invention. Details of the structure and/or the function can be substantially changed without departing from the spirit of the present invention.

INDUSTRIAL APPLICABILITY

The field rotor of a superconducting rotating machine of the present invention is useful as a field rotor of a superconducting rotating machine, the field rotor more easily satisfying both a demand to ensure a function of efficiently cooling a superconducting coil and a demand to ensure a mechanical strength for transmitting torque between the superconducting coil and an input/output shall, than the background art.

REFERENCE SIGNS LIST 10 supply shaft
12 bearing
14 supply-shaft-side slide portion
16 rotation-shaft-side slide portion
18 rotation shall
20 superconducting coil
24 input/output shaft
26 bearing
28 room-temperature damper
100 field rotor
200 field rotor

The invention claimed is:

1. A field rotor of a superconducting rotating machine comprising:
   a rotation shaft;
   a supply shaft that supplies a refrigerant to the rotation shaft at one end of the rotation shaft;
   an input/output shaft provided at the other end of the rotation shaft so as to integrally rotate with the rotation shaft; and
   a superconducting coil held on a circumferential surface of the rotation shaft to be cooled by the refrigerant, wherein the supply shaft and the input/output shaft are fixed to each other so as to rotate integrally with each other, and the rotation shaft and the supply shaft are at least partly brought in contact with each other in order to allow the rotation shaft to be supported by the supply shaft and in order to be slidably fitted to each other in a circumferential direction of the rotation shaft and in an axial direction of the rotation shaft.

2. The field rotor of a superconducting rotating machine according to claim 1, wherein the supply shaft and the rotation shaft are disposed such that one of them having relatively a large thermal contraction amount in a diameter direction upon a change from a room-temperature state to a cool-temperature state is located at the outer circumference of the other one having a relatively small thermal contraction amount.

3. The field rotor of a superconducting rotating machine according to claim 2, wherein the thermal contraction amount of the rotation shaft is relatively larger than the thermal contraction amount of the supply shaft.

4. The field rotor of a superconducting rotating machine according to claim 3, wherein the supply shaft and the rotation shaft are formed such that a clearance is formed between a vertically lower end of the supply shaft and a vertically lower end of the rotation shaft at a room-temperature state, and a clearance is not formed between the vertically lower end of the supply shaft and the vertically lower end of the rotation shaft at a cool-temperature state.

5. The field rotor of a superconducting rotating machine according to claim 1, wherein the portion of the rotation shaft, which portion is fitted to the supply shaft, is hollow.

6. The field rotor of a superconducting rotating machine according to claim 1, wherein the portion of the rotation shaft, which portion holds the superconducting coil, is hollow.

7. The field rotor of a superconducting rotating machine according to claim 1, wherein a hollow torque tube having relatively a small thickness in a diameter direction is formed between the rotation shaft and the input/output shaft.

* * * * *